July 28, 1936.  F. M. ARCHER ET AL  2,049,098
TRAILER VEHICLE
Filed Sept. 27, 1933  3 Sheets-Sheet 2
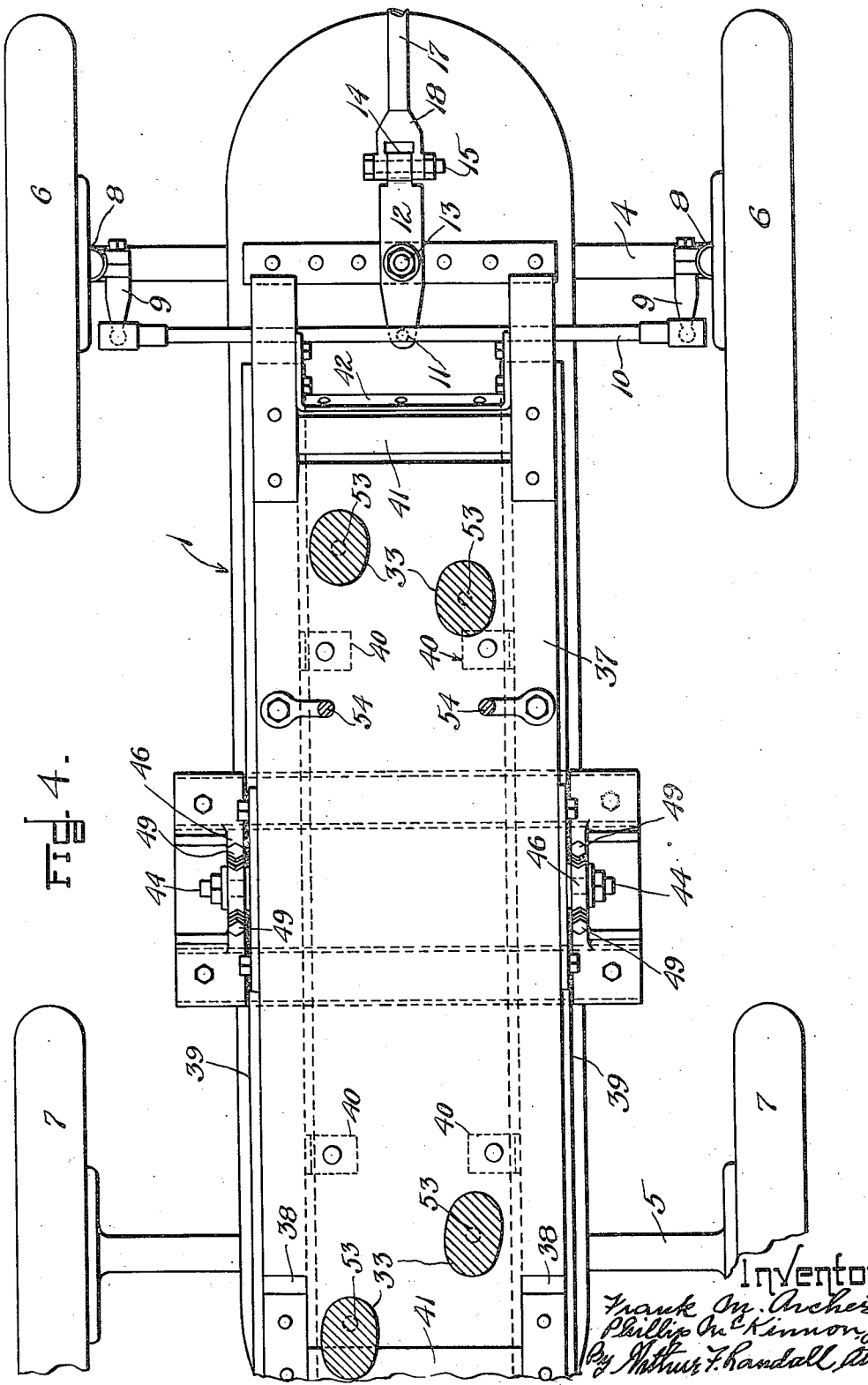

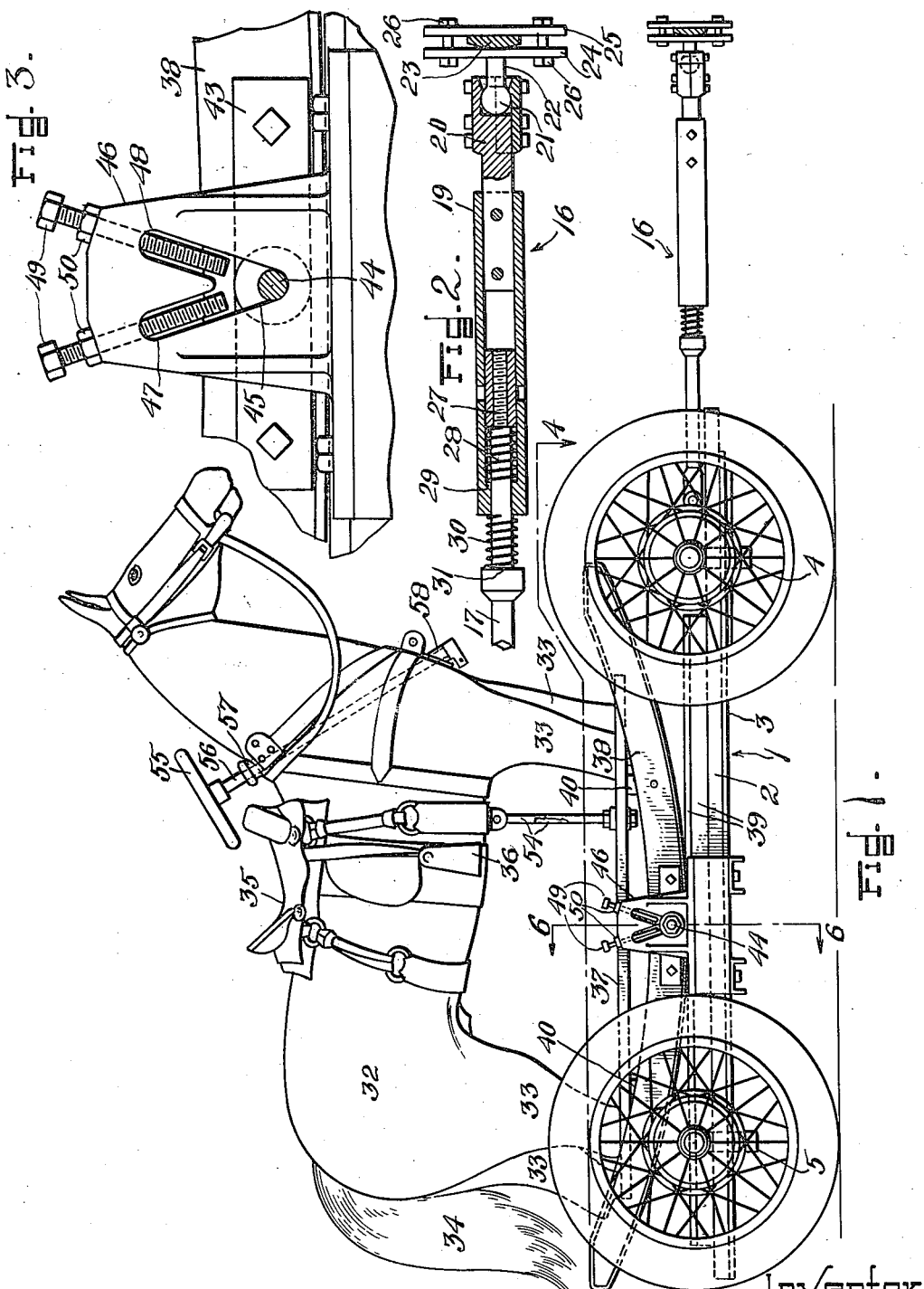

July 28, 1936.  F. M. ARCHER ET AL  2,049,098
TRAILER VEHICLE
Filed Sept. 27, 1933  3 Sheets-Sheet 3

Inventors
Frank M. Archer and
Phillip McKinnon, Jr.,
By Arthur F. Randall, Atty.

Patented July 28, 1936

2,049,098

UNITED STATES PATENT OFFICE 2,049,098

TRAILER VEHICLE

Frank M. Archer, Brookline, and Phillip McKinnon, Jr., Boston, Mass., assignors to The Moxie Company, Boston, Mass., a corporation of Massachusetts Application September 27, 1933, Serial No. 691,156

1 Claim. (Cl. 296—21)

Our invention relates to vehicles and has particular reference to vehicles such as are used for advertising purposes.

It is an object of the invention to provide an animated roadway vehicle of conspicuously distinctive and attractive appearance which will be particularly adapted to be used for advertising purposes.

It is also an object of this invention to provide an animated roadway vehicle of the character indicated embodied in a trailer attachment for an automobile or the like.

To these ends we have provided a roadway vehicle having the peculiar features of construction and mode of operation set forth in the following description, the several novel features of the invention being separately pointed out and defined in the claim at the close thereof.

In the accompanying drawings:

Figure 1 is a side elevation of a trailer attachment constructed in accordance with this invention.

Figure 2 is a longitudinal sectional view, on larger scale, of a portion of the drawbar hereinafter referred to.

Figure 3 is an enlarged detail illustrating the manner in which each rocker of the body of the vehicle is connected with the chassis.

Figure 4 is a section on line 4—4 of Fig. 1.

Figure 5:
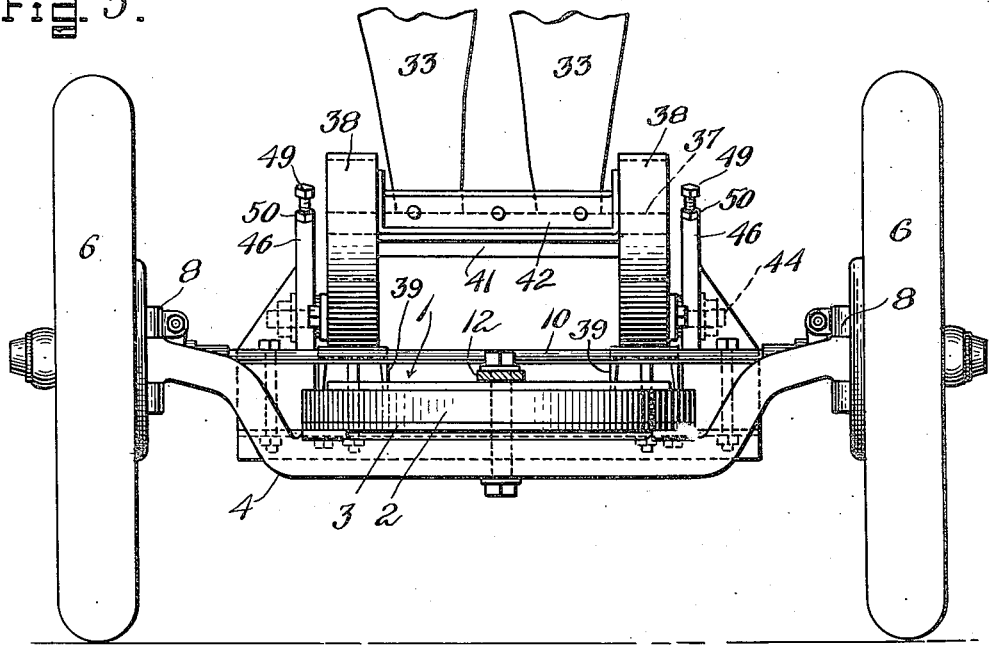
Figure 5 is a front elevation of the lower portion of the vehicle shown in Fig. 1.

The embodiment of our invention herein illustrated is constructed with a chassis 1 comprising a wooden body portion 2 to the bottom of which is secured a metal frame 3 which extends along the opposite sides of said body portion and across the ends thereof. This chassis 1 rests upon and is secured to a front axle 4 and a rear axle 5 provided, respectively, with wheels 6 and 7.

The front wheels 6 are connected with the opposite ends of the front axle 4 by steering knuckles 8 provided, as usual, with arms 9 that are pivotally connected with the opposite ends of a transverse rod 10. This rod is made at its middle with a depending stud or arm 11 by which it is pivotally connected with one of the arms of a lever 12 that is pivotally connected at 13 with the forward end portion of chassis 1 so as to swing horizontally on a vertical axis.

Lever 12 is fulcrumed at 13 intermediate its ends and its other arm is made at its forward end with an eye 14 loosely occupied by a horizontal pintle-bolt 15 which pivotally connects said forward end with the rear end of a drawbar 16 by means of which our new vehicle may be connected with an automobile or the like by means of which it is drawn over the roadway.

As shown in Figs. 2 and 4 the drawbar 16 comprises a rear spindle section 17 made at its rear end with a fork 18 that embraces eye 14 and is pivotally connected therewith by the pintle-bolt 15 so that it can swing up and down on said bolt relatively to said lever.

It will be clear that when the drawbar 16 is swung laterally in either direction by the vehicle with which its forward end is connected, said drawbar and lever 12 are swung as one on the vertical axis of the pivotal connection 13 and this movement of the lever acts through the transverse bar 10 and steering knuckles 8—9 to direct the wheels 6 in the same direction so that our new vehicle is steered by the vehicle to which it is attached so as to follow in the path of the latter.

The forward end portion of the spindle section 17 of the drawbar is telescopically fitted within the tubular rear end portion of an intermediate drawbar section 19 whose forward end is constructed with a socket 20 within which a ball 21 is rotatably confined. This ball is part of a forward spindle section 22 of the drawbar which is also constructed with a clamp by means of which its forward end is fixedly clamped to the rear bumper-bar 23 of the vehicle ahead.

The clamp just referred to comprises a jaw 24 that is a rigid part of spindle 22 and which is placed in position against the outside of bumper-bar 23; a jaw 25 which is placed in position against the inner side of the bumper-bar, and bolts 26 by means of which the two jaws are clamped tightly against the opposite sides of said bumper-bar.

Thus the drawbar structure includes a forward end section that is fastened rigidly to the rear bumper-bar of the towing vehicle and connected with the rear portion of the drawbar by a universal joint, and a rear end section that is connected with the towed vehicle by a universal joint connection that includes the two pivotal connections 13 and 15.

It is also a feature of this drawbar structure that the last-mentioned universal joint connection includes, as an element thereof, a lever member through which lateral swinging movements of the drawbar structure act to steer the front wheels of the towed vehicle so that the latter follows the vehicle ahead.

Within the tubular intermediate section 19 of the drawbar the rear spindle section 17 is provided with a head 27 which provides a shoulder against which abuts one end of a coiled buffer spring 28. This spring surrounds the spindle section 17 and its opposite end abuts a shoulder 29 provided upon the interior of the tubular section 19.

Another coiled buffer spring 30 is provided upon spindle section 17 between the rear end of the tubular intermediate section 19 and a shoulder 31 provided on said spindle section.

The two springs 28 and 30 serve as shock absorbing cushions, particularly when the towing vehicle is started and stopped.

The body of our new vehicle comprises a full sized replica 32 of the form of a horse, with the lower portions of the legs 33 omitted, said body being provided with a tail 34 of real horse-hair. This body 32 may be a solid wooden carving or it may be otherwise produced. The head of the horse is equipped with a real leather bridle provided with reins while its body has fixed thereon a real leather saddle 35 provided with stirrups, one of which is shown at 36. This saddle serves as a seat for a rider and the stirrups are used as usual by him.

The statuesque figure 32 has the lower ends of its legs 33 fitted to, and fastened in position upon, the top side of a horizontal base-board 37 provided at its opposite sides with longitudinally disposed arcuate rockers 38, each of which rests by gravity upon a longitudinally disposed horizontal rail 39 provided upon the top side of chassis 1 and constituting fixed parts thereof.

The base-board 37 is seated near its opposite ends upon the rockers 38 to which latter it is fastened by means of angle-irons 40, Figs. 1 and 4.

The opposite end portions of the rockers 38 are rigidly connected by wooden cross-bars 41 and angular metal brackets, one of which latter is shown at 42, Fig. 4.

Fixed in position upon the outer side of each rocker 38 at about the middle thereof is a metal plate 43 made with a relatively perpendicular outwardly extending trunnion 44 occuping a V-shaped slot 45, Fig. 3, formed through a vertically disposed wall or plate 46 forming part of a strong metal bracket rigidly fastened to, and forming a part of the chassis 1.

The two trunnions 44 are relatively disposed in axial alinement, one at each side of the rocker base of the horse, and a vertical transverse plane intersecting and parallel with the axes of said trunnions also intersects the center of gravity of the rocking-horse structure.

Therefore, when the rocking horse structure is at rest each trunnion 44 is at the bottom or apex of its V-shaped slot and the two branches 47 and 48 of the latter diverge upwardly away from said trunnion and equally away from said vertical plane. The median line of the branch 48 is approximately co-incident and parallel with the cycloidal path of the axis of the trunnion when the horse is rocked forwardly, while the center line of the branch 47 is approximately co-incident and parallel with the cycloidal path of said axis when the horse is rocked rearwardly.

Opposite the upper end of each branch slot 47 and 48 each vertical wall 46 of the chassis is made with a threaded hole that is occupied by a stop screw 49, Fig. 3, whose inner end is disposed within its branch slot to co-operate with the adjacent trunnion 44. These stop screws 49 are held in their adjusted positions by lock nuts 50 and serve to limit the rocking movements of the horse in both directions as will be clear. Also, excessive sidewise tilting movement of the rocking horse in either direction is prevented by the stop screws 49, while the side walls 46 prevent lateral displacement of the rockers 38 on rails 39 and guide said rockers as they roll back and forth on said rails 39.

The outer end portions of the trunnions 44 are threaded for the reception of nuts 51 between each of which and the proximate side wall 46 is arranged a washer 52.

Figure 6:
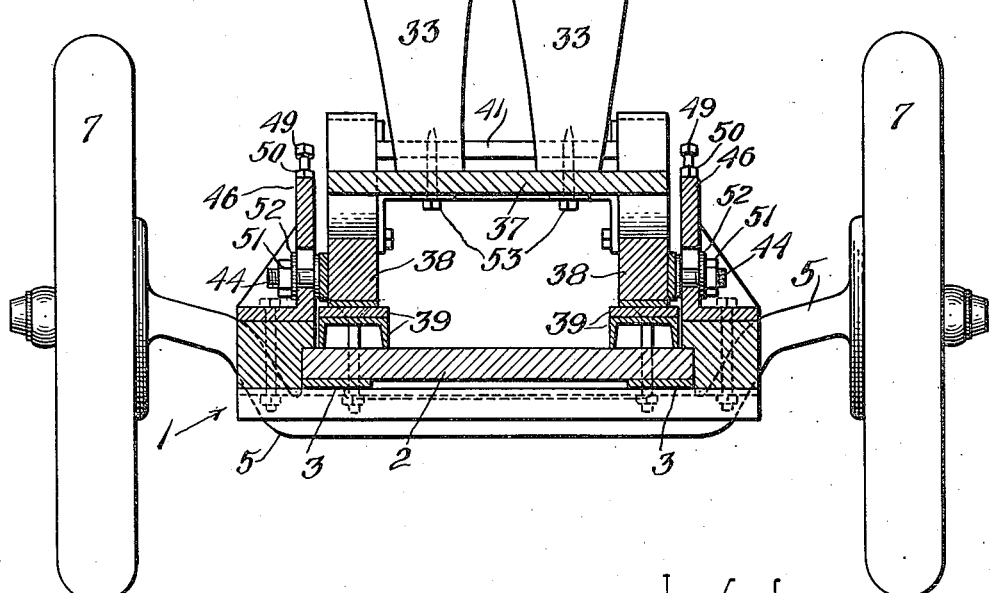
Figure 6 is a section on line 6—6 of Fig. 1.

The lower ends of the legs 33 of the horse may be fastened by lag screws 53, Figs. 4 and 6, to the base-board 37 while the body of the horse may be connected with said base-board and supported against sidewise movement relatively thereto, by means of braces or struts 54.

The rear wheels 7 may, if desired, be provided with brakes (not shown) which may be set and unset by manual rotation of a control member herein shown as a hand wheel 55 disposed in front of saddle 35 so that it is accessible to the rider. This hand wheel is fixed in position upon the upper end of a shaft 56 which extends obliquely downwardly and forwardly through the body 32 to the front of the breast where its lower end is exposed so that it can be connected with the brakes of wheels 7. Shaft 56 is journaled in bearings 57 and 58 secured to body 32.

While our new vehicle is in use and is being drawn over the roadway by an automobile or the like a rider is seated upon saddle 35 with his feet in the stirrups 36 and said rider shifts his body back and forth thereby causing the horse to roll back and forth on the rails 39 of the chassis as the vehicle and horse travel forwardly over the roadway.

Advertising devices or matter (not shown) may be provided either upon our new vehicle or upon the vehicle by which it is towed.

What we claim is:

A road trailer vehicle comprising a chassis, ground wheels forming a support therefor and including a pair of dirigible front wheels, a gravity-operated rocking horse structure embodying a base having a pair of rocker bars mounted on said chassis so that said structure is free to be rocked back and forth longitudinally thereof by said chassis when the latter is drawn over an uneven roadway and a superstructure the weight of which is distributed and balanced with respect to said rocker bars so as to be adapted to cause the same to rock automatically under the influence of the movement of the chassis, means for holding said rocking horse structure against displacement on said chassis laterally and longitudinally, and towing means connected with said dirigible front wheels.

FRANK M. ARCHER.
PHILLIP McKINNON, JR.